(12) United States Patent
Ozaki

(10) Patent No.: US 6,655,742 B1
(45) Date of Patent: Dec. 2, 2003

(54) LOCKING/UNLOCKING MECHANISM FOR HEADREST

(75) Inventor: Hideki Ozaki, Akishima (JP)

(73) Assignee: Tachi-S Co., Ltd., Tokyo (JP)

(*) Notice: Subject to any disclaimer, the term of this patent is extended or adjusted under 35 U.S.C. 154(b) by 0 days.

(21) Appl. No.: 10/158,048

(22) Filed: May 31, 2002

(51) Int. Cl.[7] .............................................. A47C 7/36
(52) U.S. Cl. .................................................... 297/410
(58) Field of Search ........................ 297/410; 292/146, 292/147, 150; 403/315, 316, 317; 70/258, 261

(56) References Cited

U.S. PATENT DOCUMENTS

| | | | |
|---|---|---|---|
| 3,544,162 A | | 12/1970 | Uchiyamada et al. |
| 3,563,602 A | * | 2/1971 | Ohta et al. ................... 297/410 |
| 3,904,241 A | * | 9/1975 | Makinen ...................... 297/391 |
| 4,482,177 A | * | 11/1984 | Nagy .......................... 292/156 |
| 5,895,094 A | * | 4/1999 | Mori et al. ................... 297/410 |
| 5,927,813 A | * | 7/1999 | Nemoto ....................... 297/391 |
| 5,987,938 A | * | 11/1999 | Frei .............................. 70/14 |
| 6,062,645 A | * | 5/2000 | Russell ........................ 297/410 |
| 6,390,558 B2 | * | 5/2002 | Fischer et al. .............. 297/410 |

FOREIGN PATENT DOCUMENTS

JP   11253266 A   *  9/1999   ............ A47C/7/38

OTHER PUBLICATIONS

Doc. No. RD 386046 A, filed Jun. 1996.*

* cited by examiner

Primary Examiner—Peter M. Cuomo
Assistant Examiner—Stephen D'Adamo
(74) Attorney, Agent, or Firm—Browdy and Neimark

(57) ABSTRACT

A locking/unlocking mechanism for headrest, provided in a headrest holder in which a headrest stay of the headrest is slidably inserted, which comprises: a lock element having a hole; a biasing element; and an unlocking hole formed in the headrest holder. The lock element is movable between a locking position for engagement with a stopper notch formed in the headrest stay and an unlocking position for disengagement from the stopper notch. The lock element is normally biased by the biasing means in a direction to the locking position. When the lock element is set in the unlocking position, an unlocking tool can be inserted in the unlocking hole of headrest holder and engaged in the hole of lock element so as to retain he lock element in the unlocking position, whereby the headrest can be easily removed from the headrest holder.

8 Claims, 2 Drawing Sheets

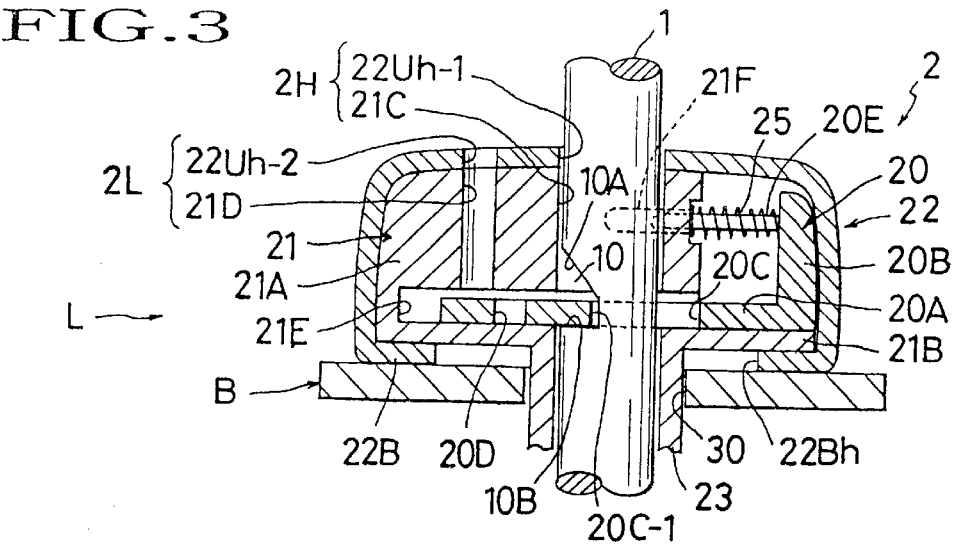
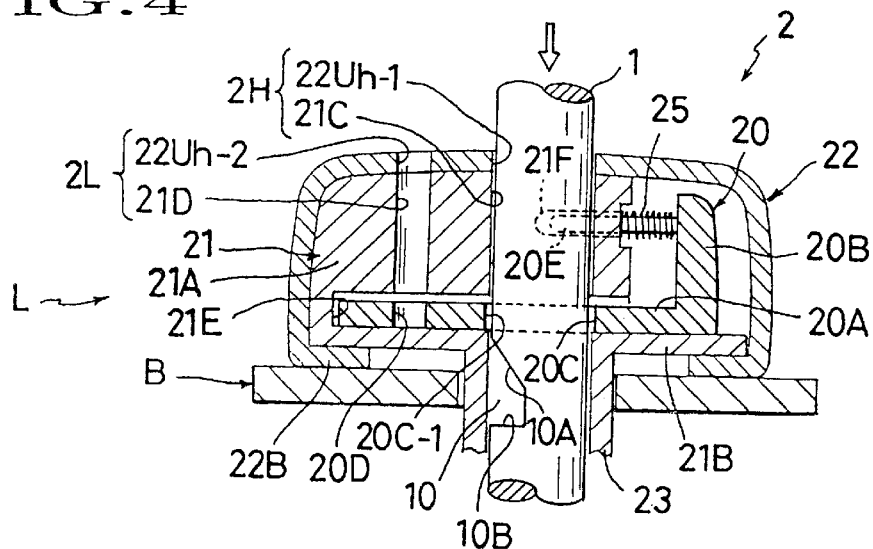
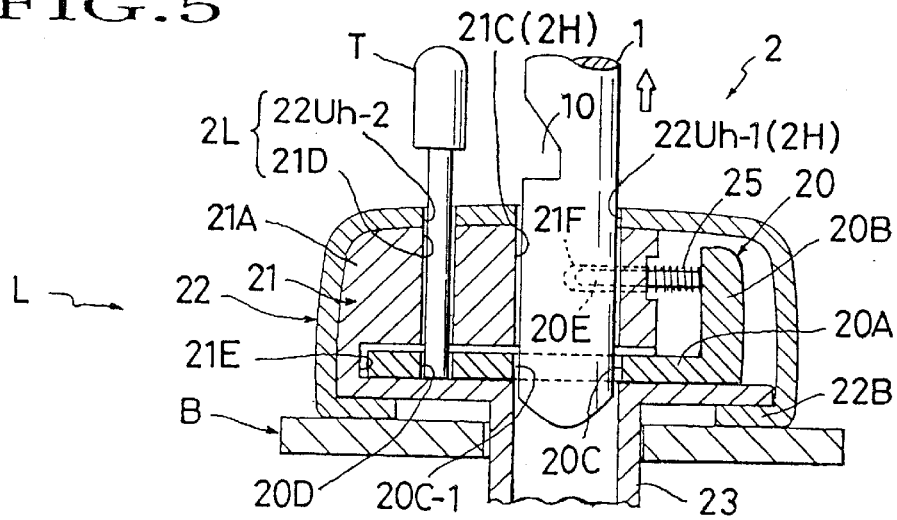

LOCKING/UNLOCKING MECHANISM FOR HEADREST

BACKGROUND OF THE INVENTION

1. Field of the Invention

The present invention relates to a mechanism for locking and unlocking a headrest for automobile.

2. Description of Prior Art

Normally, a headrest for use with an automotive seat has a pair of headrest stays projecting donwardly therefrom. Via those two headrest stays, the headrest is mounted and supported on the seat back of the automotive seat. In most cases, a pair of headrest holders are utilized to support the respective two headrest stays upon a seat back frame which is provided in the seat back. Each headrest holder is fixed on the top of seat back frame and of a cylindrical shape allowing insertion of the corresponding headrest stay therein. Further, a headrest vertical adjustment mechanism is provided between the headrest stays and headrest holders so that the headrest per se can be adjustably raised and lowered via the headrest holders according to the physique and head position of a user sitting on the seat.

Due to the cylindrical body of the headrest holder, it is possible to forcibly draw and remove the headrest stay therefrom to separate the headrest from the seat back when in no use or whenever required. But, this is not always favorable because it is troublesome to insert the removed headrest or headrest stay in the headrest holder when a user sits on the seat, and, in the case of traffic accident including a collision, a great force generated thereby may draw and separate the headrest or headrest stays away from the headrest holders, resulting in a great damage to the user.

To solve those problems, there has been made available a headrest removal preventive mechanism which can be arranged in one of the two headrest holders and in the corresponding one of the two headrest stays, so as to insure preventing removal of the headrest from the seat back. A typical conventional mode of such headrest removal preventive mechanism basically comprises: a notch formed in the headrest stay; a lock piece provided in the headrest holder fixed on a seat back frame, the lock pieces being provided with a bent contact portion and a pair of springs adapted to bias the lock piece in one direction, with such arrangement that the lock piece may be biasingly engaged in the notch to thereby completely prevent removal of the headrest from the seat back. This sort of headrest removal preventive mechanism is not designed to permit for removal of the headrest, and therefore, in the case where the headrest needs to be removed from the seat back, an unlocking arrangement will be required to release the lock piece of the headrest removal preventive mechanism from the notch formed in the headrest stay. For example, when the seat back with a headrest has to be folded down to transform its rear side into a cargo load floor, it is necessary to remove the headrest from the seat back by the unlocking arrangement. Conventionally, the typical simplified mode of the unlocking arrangement is such that a bore is formed in the headrest holder to communicate with a part of the lock piece provided therein and a suitable tool is inserted in that bore to contact and press the contact portion of the lock piece, overcoming the biasing force of the spring, so as to disengage the lock piece from the notch, thereby allowing a user to remove the headrest from the seat back.

However, such unlocking arrangement has been found defective in that a user must keep holding the tool with one hand to disengage the lock piece from the notch, while holding the headrest with another hand against movement. It is therefore troublesome and uneasy for the user to remove the headrest from the seat back.

SUMMARY OF THE INVENTION

In view of the above-stated drawbacks, it is therefore a primary purpose of the present invention to provide an improved locking/unlocking mechanism for headrest, which allows for easy removal of the headrest from a seat back of automotive seat.

In order to attain such purpose, the locking/unlocking mechanism in accordance with the present invention, which is provided in a headrest holder having a through-bore in which a headrest stay is slidably inserted, basically comprises:

a lock element which is so provided as to be movable toward and away from a through-bore of the headrest holder, the lock element including an engagement means and a hole, wherein the lock element is movable between a locking position where the engagement means of lock element is to be engaged with a stopper notch formed in the headrest stay, and an unlocking position where the engagement means is to be disengaged from the stopper notch;

a biasing means for resiliently biasing the lock element in a direction to the locking position; and an unlocking hole formed in the headrest holder in such a manner as to allow an unlocking tool to be inserted therethrough and engaged with the hole of lock element so as to retain the lock element in the unlocking position.

Accordingly, a user can easily remove the headrest from the headrest holder or the seat back frame, without using his or her one hand to keep holding the unlocking tool.

In one preferred mode, the lock element may be formed with a lock hole therein, so that the headrest stay passes through that lock hole, and the engagement means of lock element may comprise an engagement edge defined in the hole, with such an arrangement that, when a portion of the headrest stay excepting the stopper notch is positioned in the lock hole, the lock element is set in the unlocking position, whereby the engagement edge of lock hole is disengaged from the stopper notch and the unlocking hole is aligned with the hole of lock element, thereby allowing the unlocking tool to be inserted in both of the unlocking hole and hole to retain the lock element in the unlocking position, and that, when the stopper notch of headrest stay is positioned in the lock hole, the lock element is moved to the locking position by the biasing means, whereby the engagement edge of lock hole is engaged in the stopper notch.

In the case where the headrest holder includes a head adapted to be securely mounted upon the seat back frame and a cylindrical body extending downwardly from the head, with the through-bore formed in both of the head and cylindrical body, the lock element and biasing means may be provided within the head of headrest holder, such that the unlocking hole extends through the head toward said lock element.

Other features and advantages of the present invention will become apparent from reading of the descriptions hereinafter, with reference to the annexed drawings.

BRIEF DESCRIPTION OF THE DRAWINGS

FIG. 3 is a fragmentary sectional view illustrating a structure of the locking/unlocking mechanism and particularly showing the state where a headrest stay is locked by the mechanism to the headrest holder;

FIG. 4 is a fragmentary sectional view as similar to the FIG. 3, which explanatorily shows the state where the headrest stay is lowered a slight amount to cause a lock member to move to an unlocking position; and FIG. 5 is a fragmentary sectional view which explanatorily shows the state where an unlocking tool is inserted to retain the lock member in the unlocking position and the headrest stay is removed from the headrest holder.

DETAILED DESCRIPTION OF PREFERRED EMBODIMENT OF THE INVENTION

Referring to FIGS. 1 through 5, there is illustrated one exemplary mode of locking/unlocking mechanism for headrest, as generally designated by (L), which is to be used with an automotive seat, in accordance with the present invention.

Figure 1:
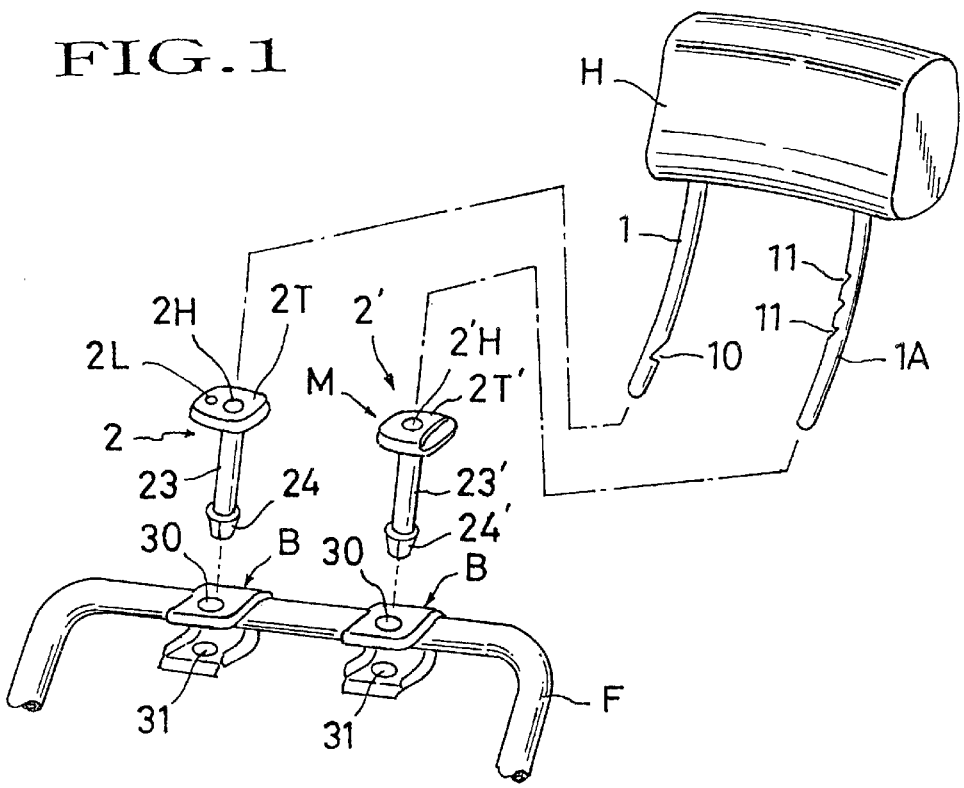
FIG. 1 is a partly broken explosive perspective view showing a constructive relation among a headrest, headrest holder and seat back frame, in which an locking/unlocking mechanism of the present invention is incorporated.

As shown in FIG. 1, for instance, upon the top of a seat back frame (F), a pair of securing brackets (B) (B) are fixedly provided, each of which is formed with a pair of upper and lower through-holes (30) (31) therein. While not shown, it is to be understood that all those seat back frame (F) and brackets (B) are provided within a seat back of an automotive seat by enclosing them with a suitable foam padding and cover material or other suitable upholstery, as is known in the art.

On the other hand, a headrest (H), which is to be used on the seat back of automotive seat for supporting a headrest of passenger, has a pair of first and second headrest stays (1) (1A) projecting downwardly therefrom. The first headrest stay (1) is shown to have a known stopper notch (10) formed in the lower end portion thereof, the stopper notch (10) being an ordinary notch found in headrest stays as one of headrest removal preventive means as described earlier. As best shown in FIG. 3, such stopper notch (10) is of an ordinary wedge-like recessed configuration having a sloped region (10A) and a horizontal flat region (10B) which serves to normally engage a lock piece or the like to prevent removal of headrest stay (1).

As also known in the art, a pair of first and second headrest holders (2) (2') are provided to supportively receive the respective first and second headrest stays (1) (1A) of the headrest (H). Both two headrest holders (2) (2') are basically identical to each other in terms of outer shape and appearance, excepting their respective functions. The first headrest holder (2) is formed by: a cylindrical body (23); a head (2T) formed in the upper end of the cylindrical body (23), the head (2T) having a through-bore (2H) formed therein; and a cylindrical tapered anchor portion (24) of elastic split type which is formed in the lower end of cylindrical body (23). Needless to mention, both through-bore (2H) of the head (2T) and cylindrical tapered stopper portion (24) communicate with an inner longitudinal through-bore of the cylindrical body (22), thereby establishing a passage or conduit through which the corresponding headrest stay (1) is slidably inserted. On the other hand, likewise, the second headrest holder (2') is formed by: a cylindrical body (23'); a head (2T') formed in the upper end of the cylindrical body (23'), the head (2T') having a through-bore (2'H) formed therein; and a cylindrical tapered anchor portion (24') of elastic split type which is formed in the lower end of the body (23'). This second headrest holder (2') is provided with a known headrest vertical adjustment mechanism, as generally designated by (M), in the head (2T') thereof, which works to lockingly engage a selected one of the plural notches (11), so that a user can actuate the adjustment mechanism to adjustably raise and lower the headrest (H) to a desired level according to his or her physique and height. As this is well known, further explanation of the headrest vertical adjustment mechanism is omitted for the sake of simplicity in description. In this connection, it is noted that the stopper notch (10) is disposed at a point adjacent to the lower end of the headrest stay (1), while by contrast, the plural notches (11) are disposed in the headrest stay (1A) at a point higher than the stopper notch (10).

Figure 2:
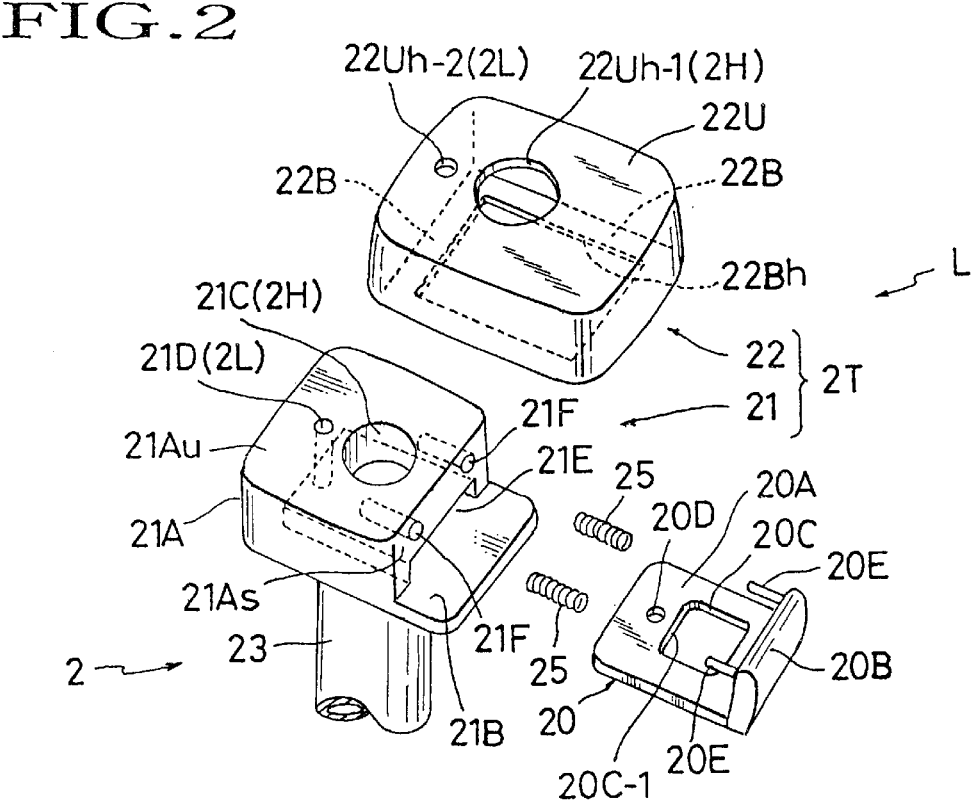
FIG. 2 is a partly broken perspective view of a principal part of the locking/unlocking mechanism.

As can be seen from FIGS. 1 and 2, the first headrest holder (2) is, at its elastic anchor portion (24) and cylindrical body portion (23), inserted through both two through-holes (30) (31) associated with one of the two brackets (B) and firmly retained in the bracket (B) against separation therefrom. Likewise, the second headrest holder (2') is retained in another of the two bracket (B) against separation therefrom. As understandable from FIGS. 1 and 3, the head (2T) of the first headrest holder (2) is exposed on the bracket (B) and thus disposed on the top of seat back frame (F).

In the illustrated embodiment, a locking/unlocking mechanism (L) is provided in the head (2T) of first headrest holder (2), which is operable for engagement and disengagement with and from the stopper notch (10) formed in the first headrest stay (1).

As shown in FIG. 2 by way of preferred example, the locking/unlocking mechanism (L) is basically comprised of: a main head portion (21) integral with the cylindrical body (23); a cap portion (22) which cooperates with the main head portion (21) to form the head (2T) of headrest holder (2); an unlocking bore (2L); and a lock member (20) movably provided in the main head portion (21).

More specifically, as can be seen from FIGS. 2 and 3 for instance, the main head portion (21) is of such a structure that comprises a cubic main body section (21A) and a horizontally extending plate section (21B). Formed in the cubic body section (21A) is a square guide hole (21E) which opens outwardly in a vertical wall (21As) of the main body section (21A), the guide hole (21E) being adapted to guide the lock member (20) in locking and unlocking directions as will be elaborated. From that vertical wall (21As), the plate section (21B) extends horizontally on the same plane with the flat bottom side of the guide hole (21E). In other words, the guide hole (21E) extends along a plane flush with the upper flat surface of the plate section (21B).

Further, formed in the cubic main body section (21A) are: a vertical opening (21C) adapted to allow insertion of the first headrest stay (1) therethrough; a vertical unlocking hole (21D) adapted to allow insertion of an unlocking tool (T) therethrough; and a pair of auxiliary guide holes (21F) (21F). Both opening (21C) and unlocking hole (21D) extend vertically through the cubic body section (21A) to communicate with the square guide hole (21E), and they open outwardly in the upper surface (21Au) of main body section (21A). As shown, the vertical opening (21C) is equal in diameter to the inner bore of cylindrical body (23) and further disposed in a coaxial relation therewith, thereby allowing insertion of the first headrest stay (1) in both of the opening (21C) and cylindrical body (23). The vertical unlocking hole (21D) is disposed at a side opposite to the vertical wall (21As) in relation to the through-bore (21C), thus communicating with the innermost area of the square guide hole (21E). On the other hand, the pair of auxiliary guide holes (21F) extend horizontally in the cubic main body section (21A) and open outwardly in the vertical wall (21As) of the same section (21A). In particular, the two auxiliary guide holes (21F) extend above and in parallel with the square guide hole (21E), as illustrated.

The lock member (2) comprises a horizontal lock plate portion (20A) and a vertical wall portion (20B) which is integrally connected with the lock plate portion (20A) and extends therefrom upwardly at a right angle. In the horizontal lock portion (20A), a rectangular lock hole (20C) and a tool insertion hole (20D) are formed. The lock hole (20C) has an engagement edge (20C-1) adapted to be engaged in the stopper notch (10) of headrest say (1), whereas the tool insertion hole (20D) is adapted to allow an end of an unlocking tool or rod (at (T) in FIG. 5) to be inserted therein, as will be explained later. A pair of guide pins (20E) (20E) are formed in the vertical wall portion (20B), projecting horizontally therefrom.

Designations (25) (25) denote a pair of coil springs, each being wound about the respective two guide pins (20E) and adapted to urge the lock member (2) in an outward direction from the main head portion (21) of headrest holder head (2), wherein such outward direction is a locking direction as will be explained later.

The lock member (20) is mounted in the main head portion (21) by first attaching the two spring coils (25) about the respective two guide pins (20E), and then inserting the lock plate portion (20A) and two guide pins (20E) thereof into the square guide hole (21E) and the two auxiliary guide holes (21F), respectively. This is partly understandable from FIG. 3. Therefore, it is seen that the lock plate portion (20A) is slidably placed in the guide hole (21E) and that the two guide pines (20E) are slidably inserted in the respective two auxiliary guide holes (21F), while being normally urged by the corresponding two coil springs (25) in a direction away from the cubic main body section (21A).

Turning back to FIG. 2, the cap portion (22), which forms a part of the head (2T), is depicted to have a cubic configuration so dimensioned to accommodate therein all the foregoing main body portion (21) and lock member (20). The cap portion (22) is formed at its lower side with a lower opening (22Bh) and a peripheral flange portion (22B) surrounding the lower opening (22Bh). Formed in the upper surface (22U) of such cap portion (22) are an upper opening (22Uh-1) and an unlocking opening (22Uh-2). The upper and unlocking openings (22Uh-1) (22Uh-2) are equal in diameter to the aforementioned vertical opening (21C) and unlocking hole (21D), respectively, and are further disposed in correspondence with those opening and hole (21C) (21D), respectively.

As can be seen from FIG. 3, both main head portion (21) and lock member (20) are accommodated in and covered with the cap portion (22) such that the flange portion (22B) of the cap portion (22) embracingly engages the bottom side of the main head portion (21), thereby preventing removal of the cap portion (22) therefrom. It is seen that the upper opening (22Uh-1) is aligned with the vertical opening (21C) to establish the through-bore (2H), whereas the unlocking opening (22Uh-2) is aligned with the unlocking hole (21D) to establish the unlocking bore (2L). Needless to mention, the through-bore (2H) is also coaxially aligned with the inner bore of the cylindrical body (23), whereupon one vertical passage or conduit is provided in the headrest holder (2), which allows the headrest stay (1 ) to be inserted and supported therein.

As understandable from FIG. 3, the lock member (20) is normally urged by the two springs (25) in a locking direction away from the cubic main portion (21A). In this connection, the term, "locking direction", is defined as a direction to bring the tool insertion hole (20D) completely out of alignment with the unlocking bore (2L), while deviating the lock hole (20C) a certain distance from the through-bore (2H), thus leaving a reduced (decrescent) opening therebetween, as in FIG. 3, which serves to permit engagement of the lock hole (20C) in the stopper notch (10) of headrest stay (1). The term, "unlocking direction", is defined as a direction to bring the tool insertion and lock holes (20D) (20C) to a complete alignment with the unlocking bore (2L) and through-bore (2H), respectively, as in FIG. 4, which permits disengagement of the lock hole (20C) from the stopper notch (10). As will be apparent, in such locking and unlocking directions, the lock member (20) is slidingly displaced in the guide hole (21E) as well as upon the plate section (20A). Otherwise stated, the lock member (20) and its lock hole (20C) are displaceable between a locking position where the associated engagement edge (20C-1) is engaged in the stopper notch (10) as in FIG. 3, and an unlocking position where the same edge (20C-1) is disengaged from the stopper notch (10) as in FIG. 4.

Now, when first inserting the headrest stay (1) into the through-bore (2H), the end (normally round or tapered end) of the headrest stay (1) is forced into that reduced opening between the lock hole (20C) and through-bore (2H), thereby causing the lock member (20) to move against the biasing force of the springs (25) in the unlocking direction towards the side where unlocking hole (21D) lies, so that the lock hole (20C) is brought to alignment with the through-bore (2H). Then, the headrest stay (1) is slidingly inserted through the aligned through-bore (2H) and hole (20C) down into the inner bore of cylindrical body (23). These steps can be readily understood by looking reversely to the illustrations of FIG. 4 and FIG. 5; namely, from FIG. 5 to FIG. 4, ignoring the arrows indicated therein. Accordingly, the first and second headrest stays (1) (1A) are inserted through and supported in the respective first and second headrest holders (2) (2').

Conversely, when it is desired to remove the headrest (H) from the seat back frame (F) or seat back, a user has to draw the headrest (H) or headrest stays (1) (1A) upwardly from the respective two headrest holders (2) (2') until the stopper notch (10) of the headrest stay (1) is brought to the lock hole (20C), at which moment, the lock member (20) is quickly moved by the biasing force of the springs (25) away from the cubic main portion (21A) in the locking direction, causing the engagement edge (20C-1) of lock hole (20C) to engage the stopper notch (10), as shown in FIG. 3. At this point, due to the fact that the horizontal flat region (10B) of stopper notch (10) is abutted against that engagement edge (20C-1), the headrest stay (1) is in a locked state and completely prevented against removal from the headrest holder (2). Then, as indicated by the arrow in FIG. 4, the user should lower the headrest (H) a slight amount so as to cause disengagement of the stopper notch (10) from the lock hole (20C). This is because, with such slight lowering of headrest, the engagement edge (20C-1) of lock hole (20C) slidingly moves along the sloped region (10A) and rides upon the outer surface of headrest stay (1), thereby causing the lock member (20) to displace in the unlocking direction and thus bringing the lock hole (20C) to complete alignment with the inner bore of cylindrical body (23). Thus, the headrest stay (1) is placed in an unlocked state with respect to the headrest holder (2). Also, the tool insertion hole (20D) is aligned with the unlocking bore (21A).

Next, referring to FIG. 5, an unlocking tool (or rod) (T) is inserted into the unlocking bore (2L) so that the end thereof is inserted in the tool insertion hole (20D). In this way, the lock member (20) is prevented against withdrawal caused by the biasing force of springs (25) in the unlocking direction, while at the same time, the unlocking tool (T) is temporarily retained in the unlocking bore (2L) against removal therefrom due to the biasing force of springs (25) which tends to enhance a frictional contact between the tool (T) and hole (20D) to a degree that the tool (T) is not removed therefrom by its own gravity. Accordingly, the user can easily remove the headrest (H) from the headrest holders (2) (2') or the seat back frame (F), without using his or her one hand to keep holding the tool.

While having described the present invention, it should be understood that the invention is not limited to the illustrated embodiments, but any other modifications, replacements and additions may be applied thereto without departing from the appended claims.

What is claimed is:

1. In combination with a seat back frame of an automotive seat and a headrest having a headrest stay formed with a stopper notch, said headrest being mounted via a headrest holder upon said seat back frame, said headrest holder having a through-bore in which said headrest stay is slidably inserted, a locking/unlocking mechanism provided in said headrest holder, comprising:
a lock element which is so provided in the headrest holder as to be movable toward and away from said through-bore, said lock element including an engagement means and a hole; wherein said lock element is movable between a locking position where said engagement means of the lock element is to be engaged with said stopper notch, and an unlocking position where said engagement means of the lock element is to be disengaged from said stopper notch;
a biasing means for resiliently biasing said lock element in a direction to said locking position, said biasing means being provide between said lock element and said headrest holder; and
an unlocking hole formed in said headrest holder in such a manner as to allow an unlocking tool to be inserted therethrough and engaged with said hole of the lock element so as to retain said lock element in said unlocking position.

2. The locking/unlocking mechanism as defined in claim 1, wherein said engagement means comprises an engagement edge formed in said lock element.

3. The locking/unlocking mechanism as defined in claim 1, wherein said headrest holder includes a head adapted to be securely mounted upon said seat back frame and a cylindrical body extending downwardly from said head, wherein said through-bore is formed in both said head and said cylindrical body, wherein said headrest stay is slidably inserted in said through-bore and wherein said lock element and said biasing means are provided within said head of the headrest holder, such that said unlocking hole extends through said head toward said lock element.

4. The locking/unlocking mechanism as defined in claim 1, wherein, in addition to said headrest stay and said headrest holder, said headrest has another headrest stay and another headrest holder in which said another headrest stay is slidably supported, and wherein a headrest vertical adjustment mechanism is provided between said another headrest stay and said another headrest holder, said headrest vertical adjustment mechanism including a plurality of notches formed in said another headrest stay, and wherein said stopper notch is disposed near to a lower end of said headrest stay, whereas said plurality of notches are disposed in said another headrest stay at a position higher than said stopper notch.

5. The locking/unlocking mechanism as defined in claim 1, wherein said lock element has a lock hole formed therein, wherein said headrest stay is slidably inserted in said through-bore and passes through said lock hole, wherein said engagement means of the lock element comprises an engagement edge defined in said lock hole, wherein, when a portion of said headrest stay excepting said stopper notch is positioned in said lock hole, said lock element is set in said unlocking position, whereby said engagement edge of the lock hole is disengaged from said stopper notch and said unlocking hole is aligned with said hole of said lock element, thereby allowing said unlocking tool to be inserted in both of said unlocking hole and said hole to retain said lock element in said unlocking position, and wherein, when said stopper notch of the headrest stay is positioned in said lock hole, said lock element is moved to said locking position by said biasing means, whereby said engagement edge of the lock hole is engaged in said stopper notch.

6. The locking/unlocking mechanism according to claim 5, wherein said lock element comprises a horizontal plate portion and a vertical portion extending vertically from said horizontal plate portion, wherein said lock hole and said hole are formed in said horizontal plate portion, and wherein said biasing means is provided between said vertical portion of the lock element and said headrest holder.

7. The locking/unlocking mechanism according to claim 5, wherein said headrest holder includes a head adapted to be securely mounted upon said seat back frame and a cylindrical body extending downwardly from said head portion, wherein said through-bore is formed in both said head and said cylindrical body, and wherein said lock element and said biasing means are provided within said head of the headrest holder, such that said unlocking hole extends through said head toward said lock element.

8. The locking/unlocking mechanism according to claim 7, wherein a horizontally extending hole is formed in said head of the lock element, wherein said lock element comprises: a horizontal plate portion slidably placed in said horizontally extending hole; and a vertical portion extending vertically from said horizontal plate portion, wherein said lock hole and said hole are formed in said horizontal plate portion, and wherein said biasing means is provided between said vertical portion of the lock element and said headrest holder.

* * * * *